(12) United States Patent
Liu

(10) Patent No.: US 8,866,011 B2
(45) Date of Patent: Oct. 21, 2014

(54) ELECTRONIC DEVICE AND CONNECTION MECHANISM THEREOF

(75) Inventor: Chi-Yuan Liu, Taipei Hsien (TW)

(73) Assignee: Acer Incorporated, Taipei Hsien (TW)

( * ) Notice: Subject to any disclaimer, the term of this patent is extended or adjusted under 35 U.S.C. 154(b) by 147 days.

(21) Appl. No.: 13/542,623

(22) Filed: Jul. 5, 2012

(65) Prior Publication Data
US 2013/0161089 A1 Jun. 27, 2013

(30) Foreign Application Priority Data
Dec. 26, 2011 (TW) .............................. 100148546 A

(51) Int. Cl.
*H05K 5/00* (2006.01)

(52) U.S. Cl.
USPC .......................... 174/50; 174/138 G; 361/809

(58) Field of Classification Search
USPC .......... 174/50, 59, 520, 549, 138 G; 361/807, 361/809, 810
See application file for complete search history.

(56) References Cited

U.S. PATENT DOCUMENTS

| | | | |
|---|---|---|---|
| 1,480,839 A | | 1/1924 | Robinson |
| 5,362,187 A * | | 11/1994 | Scalise ........................... 411/555 |
| 6,333,855 B2 * | | 12/2001 | Prabaonnaud et al. ....... 361/758 |
| 6,390,829 B1 * | | 5/2002 | Rademacher ................... 439/74 |
| 6,493,233 B1 * | | 12/2002 | De Lorenzo et al. ......... 361/752 |
| 6,542,372 B1 * | | 4/2003 | Paquin et al. ................. 361/758 |
| 6,587,352 B1 * | | 7/2003 | Lin ............................... 361/758 |
| 6,863,562 B1 * | | 3/2005 | Jensen et al. .................. 439/571 |
| 6,864,433 B1 * | | 3/2005 | Fetzer et al. ............... 174/138 G |
| 6,994,586 B2 * | | 2/2006 | Kanehira ....................... 439/564 |
| 7,287,738 B2 * | | 10/2007 | Pitlor ............................ 248/544 |
| 8,373,999 B1 * | | 2/2013 | Eifert ............................ 361/804 |
| 8,552,298 B2 * | | 10/2013 | Liu et al. .................. 174/138 E |
| 8,553,399 B2 * | | 10/2013 | Su ............................ 361/679.02 |
| 2005/0220379 A1 * | | 10/2005 | Yazawa et al. ................ 384/100 |
| 2008/0232072 A1 * | | 9/2008 | Edwards et al. .............. 361/759 |
| 2012/0106076 A1 * | | 5/2012 | Senatori et al. .......... 361/679.55 |

FOREIGN PATENT DOCUMENTS

TW 201106129 2/2011

OTHER PUBLICATIONS

Taiwanese language office action dated Oct. 7, 2013.
English language translation of abstract of TW 201106129 (published Feb. 16, 2011).

* cited by examiner

*Primary Examiner* — Hung Ngo
(74) *Attorney, Agent, or Firm* — McClure, Qualey & Rodack, LLP

(57) ABSTRACT

A connection mechanism is provided. The connection mechanism includes a first fixing member, a fixer, an elastic element, a second fixing member and a connection element. The first fixing member includes a first side and second side, wherein the first side is opposite to the second side. The fixer passes through the first fixing member and is pivotable relative to the first fixing member along the first direction, wherein the fixer has a head portion and an end portion. The head portion is located on the first side and has an outer surface, and the second portion protrudes from the second side. The elastic element is disposed on the first side of the first fixing member and is abutting the outer surface, to prevent the fixer from rotating along a direction opposite the first direction. The connection element is disposed on the second fixing member and has a hollow structure.

12 Claims, 7 Drawing Sheets

ELECTRONIC DEVICE AND CONNECTION MECHANISM THEREOF

CROSS REFERENCE TO RELATED APPLICATIONS

This Application claims priority of Taiwan Patent Application No. 100148546, filed on Dec. 26, 2011, the entirety of which is incorporated by reference herein.

BACKGROUND OF THE INVENTION

1. Field of the Invention

The present invention relates to a connection mechanism, and in particular relates to a connection mechanism for connecting a housing and a cover for an electronic device.

2. Description of the Related Art

With reference to FIG. 1, conventionally, a cover C2 is formed on the backside of a notebook or tablet computer, which is fixed to housing C1 by screws S. When the computer needs to be repaired, the screws S need to be detached from the computer to remove the cover C2. It takes a lot of time to attach and detach the screws S, and the screws S decrease the integrality and beauty of the notebook or the tablet computer. Therefore, a connection mechanism which can maintain the integrality and beauty of electronic devices is required.

BRIEF SUMMARY OF THE INVENTION

A connection mechanism is provided. The connection mechanism includes a first fixing member, a fixer, an elastic element, a second fixing member and a connection element. The first fixing member includes a first side and second side, wherein the first side is opposite to the second side. The fixer passes through the first fixing member and is rotatable relative to the first fixing member along a first direction, wherein the fixer has a head portion and an end portion, the head portion is located at the first side and has an outer surface, and the second portion protrudes from the second side. The elastic element is disposed on the first side of the first fixing member and is abutting the outer surface, to prevent the fixer from rotating along a direction opposite to the first direction. The connection element is disposed on the second fixing member and has a hollow structure, wherein when a force is applied on the first fixing member toward the second fixing member, the end portion of the fixer is fixed into the connection element to join the first fixing member and the second fixing member.

In one embodiment, a male thread is formed on the end portion of the fixer, a female thread is formed on the connection element, and when the end portion of the fixer is fixed into the connection element, the male thread matches the female thread.

In one embodiment, the outer surface has a continuous serrated structure or a rough structure.

In one embodiment, the diameter of the head portion of the fixer is greater than the diameter of the end portion.

In one embodiment, the elastic element comprises a wedging portion and an elastic portion, and the wedging portion is connected to the elastic portion. The wedging portion wedges a receiving portion of the first fixing member, and the elastic portion abuts the outer surface of the head portion to prevent the fixer from rotating along the direction opposite to the first direction.

In one embodiment, the elastic portion extends toward the fixer, and an obtuse angle is formed between the elastic portion and the wedging portion.

In one embodiment, the wedging portion has a U-shaped structure.

In one embodiment, a circular recess and a through hole are formed on the fixer, the through hole is formed in the bottom of the circular recess, and the fixer passes through the through hole.

In one embodiment, the first fixing member further has a receiving portion and an aperture. The elastic element is disposed in the receiving portion, the circular recess is communicated with the receiving portion, and the aperture is formed on the bottom of the receiving portion.

In one embodiment, an electronic device is provided, including a cover, a housing and the connection mechanism mentioned above, wherein the first fixing member is fixed to the cover, and the second fixing member is fixed to the housing.

In one embodiment, the cover has an opening, wherein a rod passes through the opening, pushing and deforming the elastic element in an outward direction from the fixer to separate the elastic element from the fixer.

In one embodiment, a tapered structure is formed on one end of the rod.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
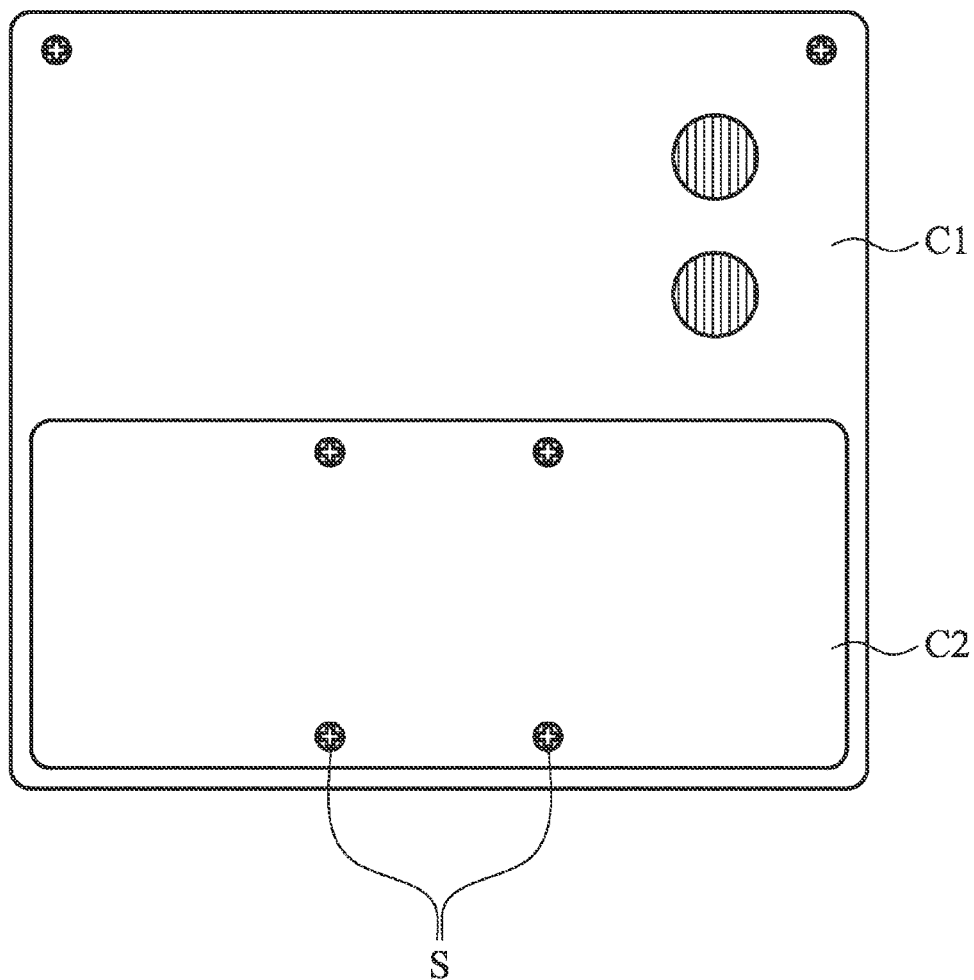
FIG. 1 shows a cover fixed to a housing of a conventional design.
Figure 2:
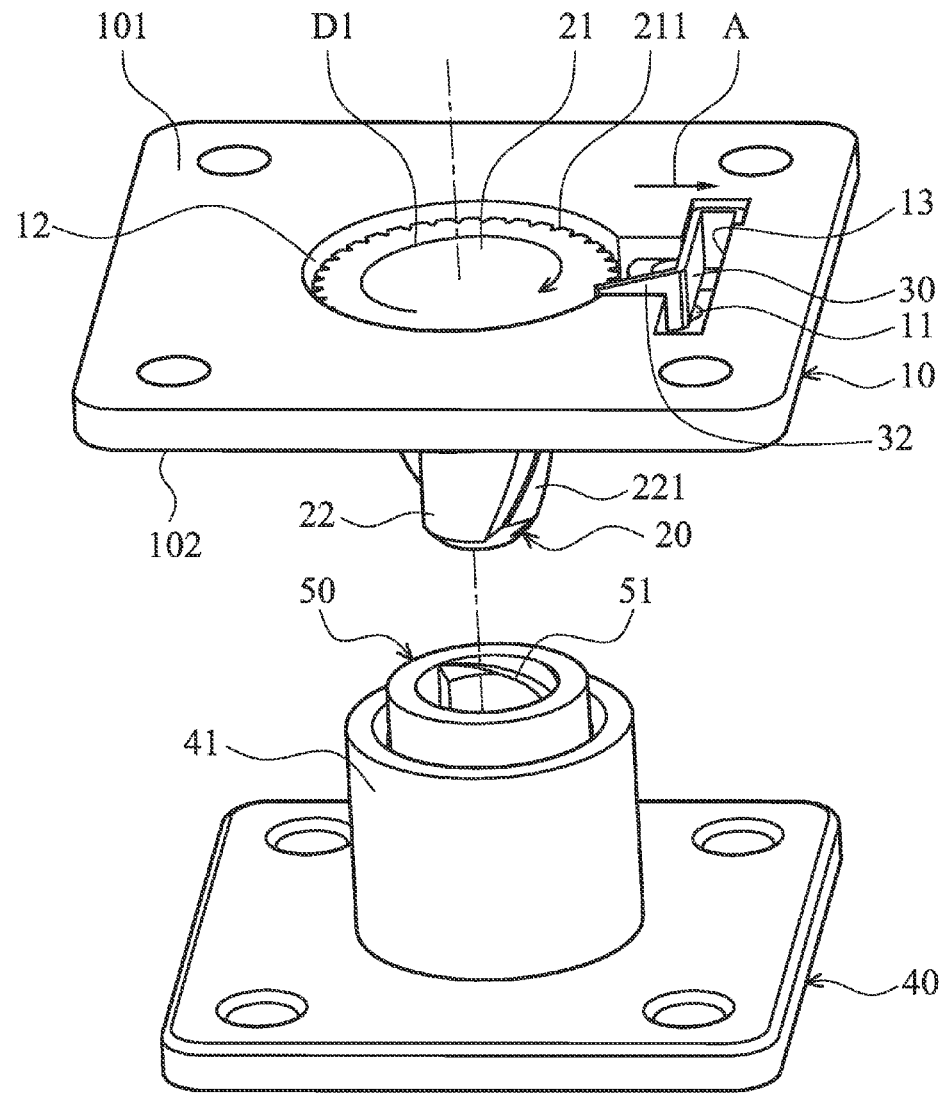
FIG. 2 shows the connection mechanism of an embodiment of the invention.

With reference to FIG. 2, a connection mechanism of an embodiment of the invention can be utilized to combine a housing and the cover of an electronic device (for example, the housing C1 and the cover C2 of FIG. 1). The connection mechanism of the embodiment of the invention comprises a first fixing member 10, a fixer 20, an elastic element 30, a second fixing member 40 and a connection element 50. The fixer 20 pivots on the first fixing member 10. The connection element 50 is embedded in a hollow base 41 above the second fixing member 40.

Figure 3A:
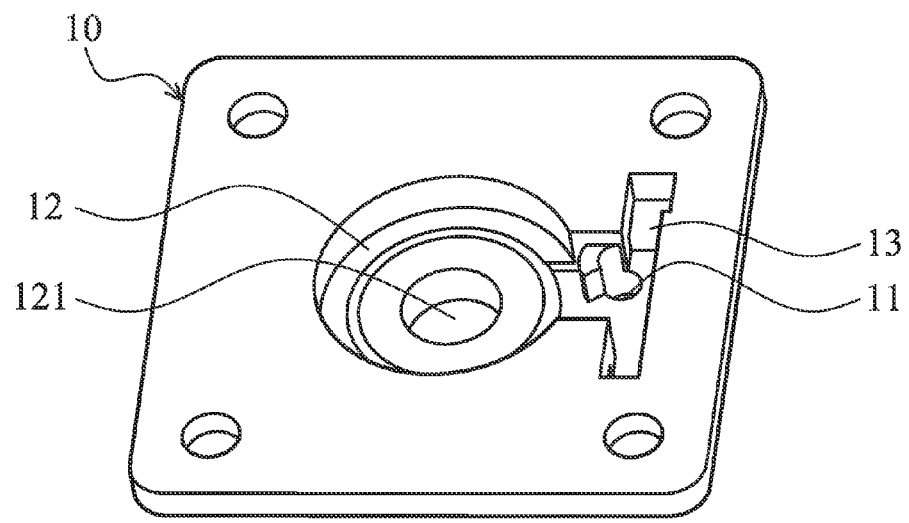
FIG. 3A shows the first fixing member of an embodiment of the invention.
Figure 3B:
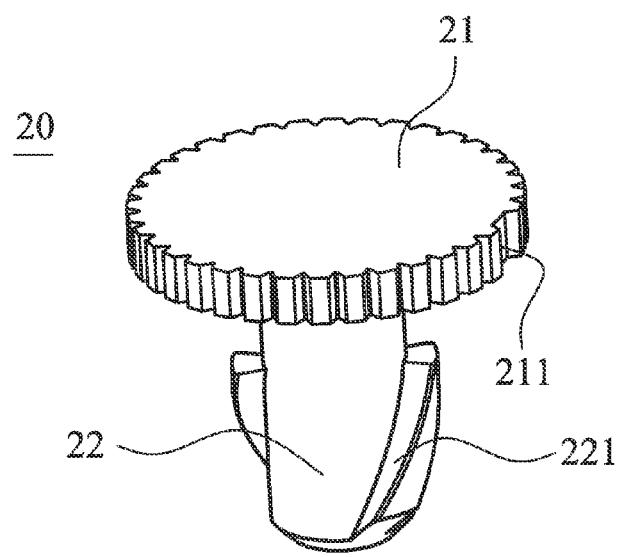
FIG. 3B shows the fixer of an embodiment of the invention.

With reference to FIGS. 2 and 3A, an aperture 11, a circular recess 12 and a receiving portion 13 are formed on a first side 101 of the first fixing member 10. The elastic element 30 is received in the receiving portion 13, the circular recess 12 is communicated with the receiving portion 13, and the aperture 11 is formed on the bottom of the receiving portion 13. A through hole 121 is formed in the center of the circular recess 12. The fixer 20 passes through the first fixing member 10 via the through hole 121, and pivots relative to the first fixing member 10. As shown in FIGS. 2 and 3B, the diameter of the head portion 21 of the fixer 20 is greater than that of the end portion 22 thereof, wherein the head portion 21 is received in the recess 12, and the end portion 22 passes through the first fixing member 10. In this embodiment of the invention, an annular outer surface 211 surrounds the head portion 21 of the fixer 20. The outer surface 211 has a continuous serrated structure or rough structure. The end portion 22 of the fixer 20 protrudes from a second side 102 below the first fixing member 10. A male thread 221 is formed on the end portion 22 of the fixer 20 to match the connection element 50.

Figure 3C:
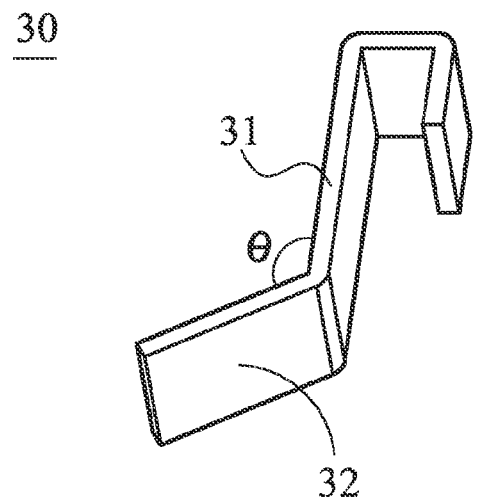
FIG. 3C shows the elastic element of an embodiment of the invention.

With reference to FIGS. 2 and 3C, the elastic element 30 comprises a wedging portion 31 and an elastic portion 32, wherein the wedging portion 31 is U-shaped and wedges the receiving portion 13 of the first fixing member 10. An obtuse angle θ is formed between the elastic portion 32 and the wedging portion 31. The elastic portion 32 extends from the receiving portion 13 toward the recess 12, and abuts the outer surface 211 of the head portion 21 of the fixer 20 (as shown in FIG. 2).

Figure 3D:
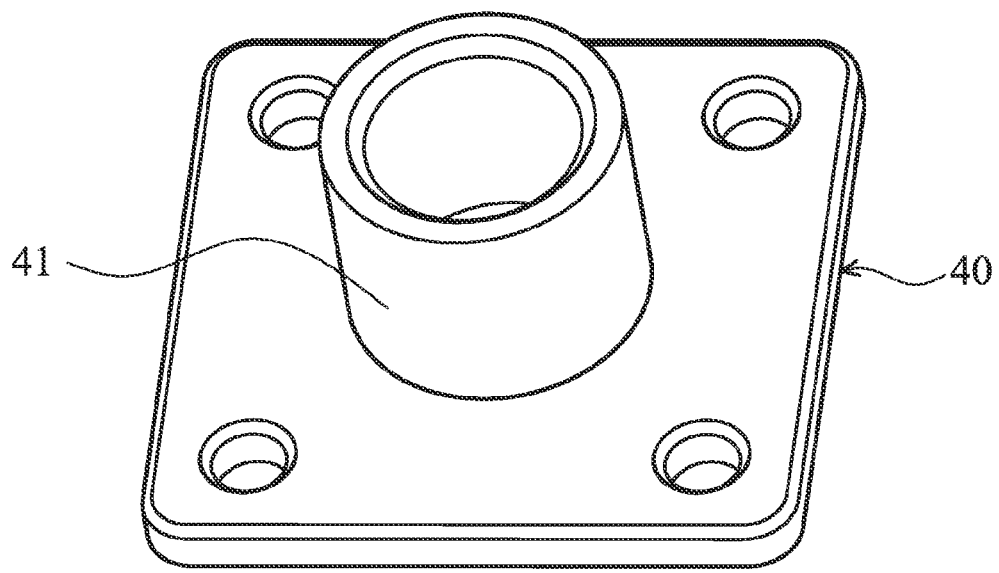
FIG. 3D shows the second fixing member of an embodiment of the invention.
Figure 3E:
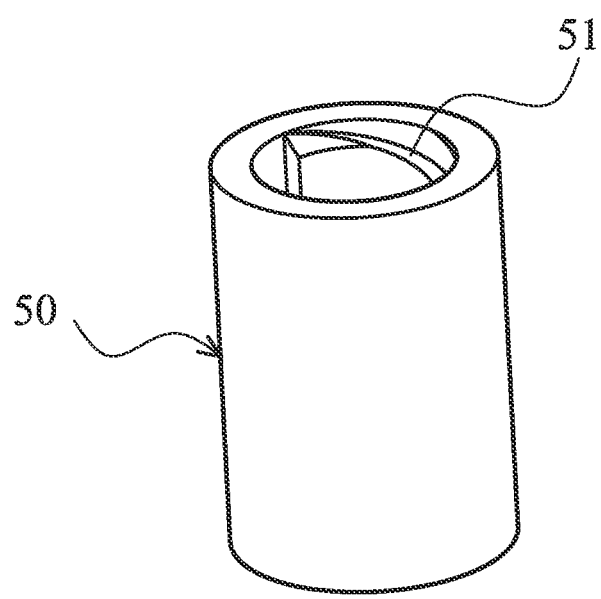
FIG. 3E shows the connection element of an embodiment of the invention.
Figure 4:
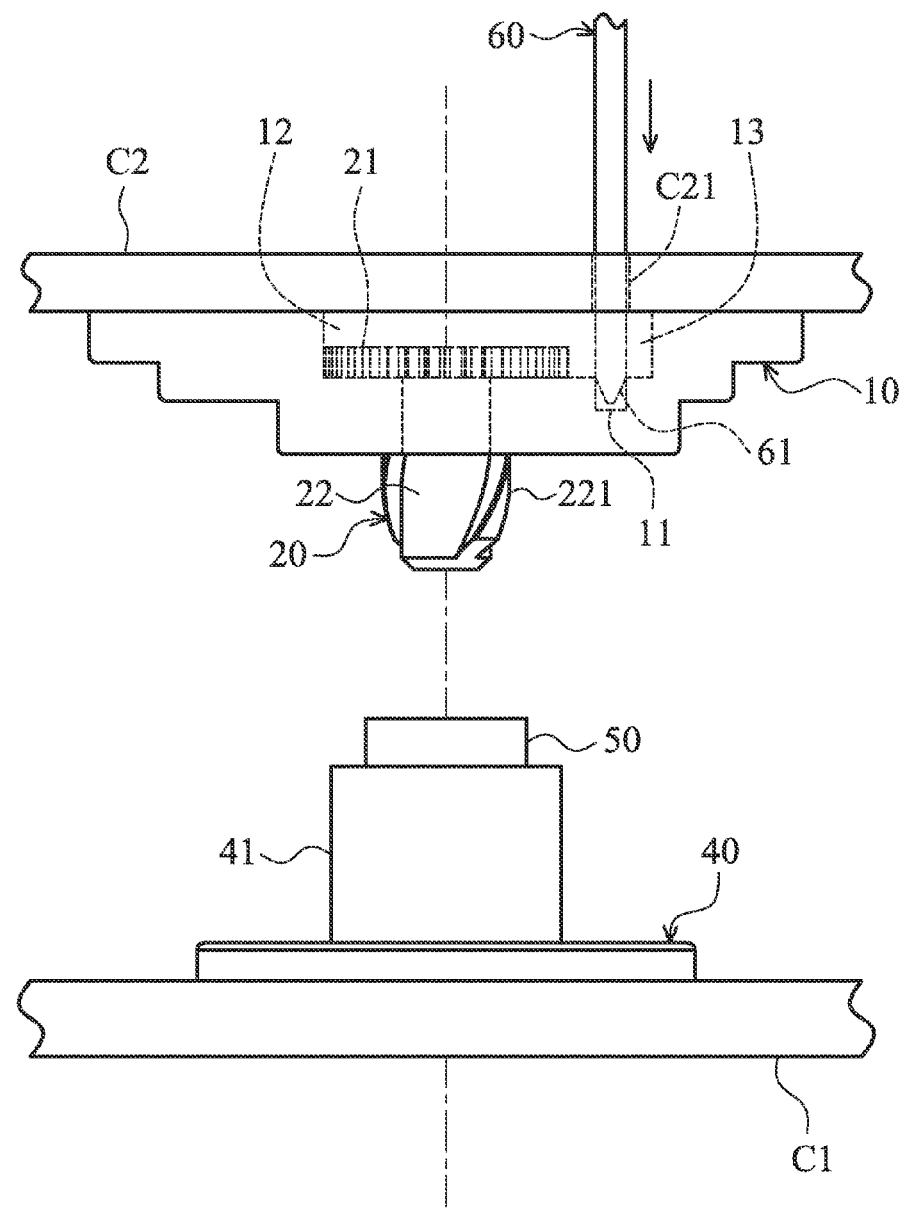
FIG. 4 shows the first and second fixing members respectively fixed to a housing and the cover of an electronic device.

With reference to FIGS. 2, 3D and 3E, the connection element 50 is embedded into the base 41 of the second fixing member 40. The first fixing member 10 and the second fixing member 40 are made of plastic materials, and are fixed onto surfaces of the housing C1 and the cover C2 of the electronic device via heat melting (as shown in FIG. 4). When the housing C1 is being connected to the cover C2, a force is applied on the cover C2 to connect the cover C2 to the housing C1. The male thread 221 on the end portion 22 of the fixer 20 (disposed on the first fixing member 10) matches the female thread 51 on the inner surface of the connection element 50, and the fixer 20 is therefore rotated along the first direction D1 (as shown in FIG. 2).

As shown in FIG. 2, the elastic portion 32 of the elastic element 30 abuts the outer surface 211 surrounding the head portion 21 of the fixer 20, and an inclined angle is formed therebetween. Thus the fixer 20 can only be rotated along the first direction D1, and cannot be rotated along the direction opposite to the first direction D1. Therefore, when the fixer 20 is pressed to be fixed to the connection element 50, the fixer 20 and the connection element 50 are sufficiently connected, and are prevented from separation. For example, the outer surface 211 has a continuous serrated structure, the elastic portion 32 of the elastic element 30 abuts the outer surface 211 of the fixer 20, and the fixer 20 thus can only be rotated along the first direction D1. Or, the outer surface 211 is a rough surface, and a friction force between the elastic portion 32 of the elastic element 30 and the outer surface 211 restricts the fixer 20 only being rotated along the first direction D1 to prevent the fixer 20 from becoming separated from the connection element 50.

Figure 5:
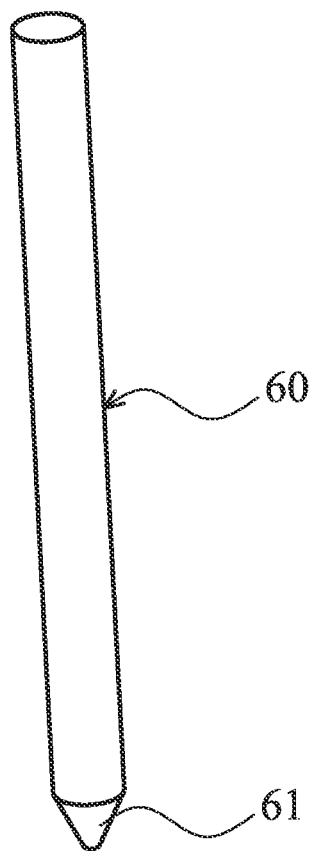
FIG. 5 shows the rod of an embodiment of the invention.

With reference to FIGS. 2, 4 and 5, when the fixer 20 is being separated from the connection element 50, a longitudinal rod 60 passes through an opening C21 of the cover C2, and extends to the aperture 11 on the bottom of the receiving portion 13 (as shown in FIG. 4). The elastic element 30 in the receiving portion 13 is pressed by the rod 60 and moves toward the outer side of the fixer 20 (with reference to FIG. 2, along the direction of arrow A). The elastic portion 32 is therefore separated from the outer surface 211 of the fixer 20, and the fixer 20 is rotated along the direction opposite to the first direction D1 to be separated from the connection element 50 underneath it.

As shown in FIG. 5, the rod 60 has an elongated and thin body, and a tapered structure 61 is formed on the front end of the body. As mentioned above, the rod 60 passes through the opening C21 of the cover C2 to the aperture 11 to press the elastic element 30, and it deforms the elastic element 30 toward outer side of the fixer 20. The fixer 20 therefore can be rotated along the direction opposite to the first direction D1 to be separated from the connection element 50 underneath it, and the cover 20 can be separated from the housing C1 of the electronic device.

The invention provides an electronic device and a connection mechanism thereof. The connection mechanism comprises a first fixing member, a fixer, an elastic element, a second fixing member and a connection element. The first fixing member is fixed to the cover of the electronic device, and the second fixing member is fixed to the housing of the electronic device. When the cover is being connected to the housing, the cover is pressed toward the housing, and the fixer of the first fixing member is rotated along the first direction to be fixed into the connection element of the second fixing member. The elastic element abuts the outer surface of the fixer to prevent the fixer from being rotated along the direction opposite to the first direction and separated therefrom. When the cover is being separated from the housing, a rod passes through the opening of the cover to push the elastic element allowing the fixer to rotate along the direction opposite to the first direction, and the cover can be separated from the housing. The invention needs no screw. Only a small opening (for example, opening C21 in FIG. 4) is required on the cover with a dimension corresponding to the rod. The connection mechanism of the invention can be easily assembled or disassembled, which retains the integrality and beauty of the electronic device, and can be utilized in electronic devices such as a notebook or tablet computer.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A connection mechanism, comprising:
    a first fixing member, comprising a first side and second side, wherein the first side is opposite to the second side;
    a fixer, passing through the first fixing member and rotatable relative to the first fixing member along a first direction, wherein the fixer has a head portion and an end portion, the head portion is located at the first side and is provided with an outer surface, and the end portion protrudes from the second side;

an elastic element, disposed on the first side of the first fixing member and abutting the outer surface, to prevent the fixer from rotating along a direction opposite to the first direction;

a second fixing member;

a connection element, disposed on the second fixing member and with a hollow structure provided, wherein when a force is applied on the first fixing member toward the second fixing member, the end portion of the fixer is fixed into the connection element to join the first fixing member and the second fixing member.

2. The connection mechanism as claimed in claim 1, wherein a male thread is formed on the end portion of the fixer, a female thread is formed on the connection element, and when the end portion of the fixer is fixed into the connection element, the male thread matches the female thread.

3. The connection mechanism as claimed in claim 1, wherein the outer surface has a continuous serrated structure or a rough structure.

4. The connection mechanism as claimed in claim 1, wherein a diameter of the head portion of the fixer is greater than a diameter of the end portion.

5. The connection mechanism as claimed in claim 1, wherein the elastic element comprises a wedging portion and an elastic portion, the wedging portion is connected to the elastic portion, the wedging portion wedges a receiving portion of the first fixing member, and the elastic portion abuts the outer surface of the head portion to prevent the fixer from rotating along the direction opposite to the first direction.

6. The connection mechanism as claimed in claim 5, wherein the elastic portion extends toward the fixer from the wedging portion, and an obtuse angle is formed between the elastic portion and the wedging portion.

7. The connection mechanism as claimed in claim 5, wherein the wedging portion has a U-shaped structure.

8. The connection mechanism as claimed in claim 1, wherein a circular recess and a through hole are formed on the fixer, the through hole is formed in the center of the circular recess, and the fixer passes through the through hole.

9. The connection mechanism as claimed in claim 8, wherein the first fixing member further comprises a receiving portion and an aperture, the elastic element is disposed in the receiving portion, the circular recess is communicated with the receiving portion, and the aperture is formed on bottom of the receiving portion.

10. An electronic device, comprising:

a cover;

a housing; and the connection mechanism as claimed in claim 1, wherein the first fixing member is fixed to the cover, and the second fixing member is fixed to the housing.

11. The electronic device as claimed in claim 10, wherein the cover has an opening, and a rod passes through the opening, pushing and deforming the elastic element toward an outward direction of the fixer to separate the elastic element from the fixer.

12. The electronic device as claimed in claim 11, wherein a tapered structure is formed on one end of the rod.

\* \* \* \* \*